United States Patent
Yang

(10) Patent No.: US 7,545,742 B2
(45) Date of Patent: Jun. 9, 2009

(54) APPARATUS AND METHOD FOR CONTROLLING AN ETHERNET SWITCH'S BANDWIDTH

(75) Inventor: Myung-Hoon Yang, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 743 days.

(21) Appl. No.: 10/882,109

(22) Filed: Jun. 29, 2004

(65) Prior Publication Data

US 2005/0053092 A1 Mar. 10, 2005

(30) Foreign Application Priority Data

Jun. 30, 2003 (KR) .................. 10-2003-0043825

(51) Int. Cl.
*H04J 3/14* (2006.01)
(52) U.S. Cl. .................. 370/230.1; 370/360; 370/468
(58) Field of Classification Search .................. 709/201, 709/232, 235; 370/229, 235, 230.1, 447
See application file for complete search history.

(56) References Cited

U.S. PATENT DOCUMENTS

2002/0131365 A1* 9/2002 Barker et al. .................. 370/235

2004/0215947 A1* 10/2004 Ward et al. .................. 712/245

FOREIGN PATENT DOCUMENTS

KR 1999-4498 1/1999
KR 10-235690 9/1999

OTHER PUBLICATIONS

Lim "Centralized transmission probability control scheme for fair packet data services in CDMA S-ALOHA system" Electronic Letters pp. 1207-1209, Aug. 7, 2003.*
English language abstract of Korean Publication No. 10-235690.
English language abstract of Korean Publication No. 1999-4498.
"Test Methodology for IEEE Standards for Local and Metropolitan Area Networks—", IEEE Std 1802.3-2001, Oct. 19, 2001, 94 pp.

* cited by examiner

*Primary Examiner*—Seema S Rao
*Assistant Examiner*—Henry Baron
(74) *Attorney, Agent, or Firm*—Marger Johnson & McCollom, P.C.

(57) ABSTRACT

A bandwidth control apparatus controls a bandwidth of a port in a network switch. An apparatus is provided that includes a random variable generating section to generate a random variable corresponding to a predetermined ratio associated with a bandwidth decrease. A timer generates an expire signal and a bandwidth control section generates a transmit enable signal to a port responsive to the random variable and the expire signal. And a port controller transmits data frames responsive to the transmit enable signal and to generate a transmit request signal to the bandwidth control section.

18 Claims, 9 Drawing Sheets

APPARATUS AND METHOD FOR CONTROLLING AN ETHERNET SWITCH'S BANDWIDTH

CROSS-REFERENCE TO RELATED APPLICATIONS

This application claims priority from Korean Patent Application No. 2003-43825 filed on Jun. 30, 2003, the contents of which are incorporated by reference.

BACKGROUND

1. Field of the Invention

The present invention relates to an apparatus and method for controlling an Ethernet switch's bandwidth.

2. Description of the Related Art

The Institute of Electrical and Electronic Engineers standard number 802.3 titled "Local and Metropolitan Area Networks" (802.3 Standard) defines an Ethernet switch. Ethernet is a common Local Area Network (LAN) having a maximum of 1024 nodes in one network.

FIG. 1 is a schematic view of an Ethernet switch. Referring to FIG. 1, an address lookup section 100 checks source and destination addresses of a received data packet to configure a lookup table 102, and determines a port to which the received packet may be transmitted. A queue manager 104 controls the order in which data packets are transmitted to first, second, third, . . . , nth ports (110-1, 110-2, 110-3, . . . , 110-n) based on received order (or sequence) and priority of data packets. A memory manager 120 manages a packet memory 130 in which data packets are stored.

First, second, third, . . . , nth port controllers (140-1, 140-2, 140-3, . . . , 140-n) checks whether a received data packet has errors, and extracts an address from the received data packet to output the extracted address to the address lookup section 100. The first, second, third, . . . , nth port controllers (140-1, 140-2, 140-3, . . . , 140-n) store the received data packet in the packet memory 130 responsive to the memory manager 120, reads data packets from the packet memory 130, and transmits the data packets to the ports 110-1, 110-2, 110-3, . . . 110-n.

The first, second, third, . . . , nth port controllers (140-1, 140-2, 140-3, . . . , 140-n) control the bandwidth of the ports 110-1, 110-2, 110-3, . . . 110-n. For example, the first, second, third, . . . , nth port controllers (140-1, 140-2, 140-3, . . . , 140-n) may reduce the bandwidth from 100 Mbps to 500 Mbps or 250 Mbps as appropriate.

According to a conventional method of controlling (or restricting) bandwidth of the Ethernet switch, the quantity of data, e.g., number of frames, is controlled (or restricted) during a predetermined time slot. The conventional method has a drawback. The quantity of data to be transmitted via a corresponding port of the Ethernet switch may be restricted. In particular, after a predetermined quantity of data are transmitted via the corresponding port of the Ethernet switch, no more data may be transmitted before the time slot expires when the Ethernet switch has to transmit larger quantity of data than the bandwidth allocated to it.

FIG. 2 is a block diagram showing a conventional port controller. As shown in FIG. 2, a port controller 200 transmits the data frame stored in a packet buffer 210 to Media Access Control (MAC) transmitting section 220 corresponding to an OSI 7 data link layer. The port controller 200 transmits data frame size information (Tx data count) to a bandwidth control section 230.

The bandwidth control section 230 counts the data packets that are transmitted to the MAC transmitting section 220 using the size information (Tx data count) outputted from the port controller 200. A timer 240 is reset by a reset signal outputted from the bandwidth control section 230 when a data packet begins to be transmitted. The timer 240 counts up to a predetermined time slot.

And the bandwidth control section 230 stops transmitting a Tx enable signal when the counting corresponds to a predetermined restricted bandwidth. The port controller 200 stops transmitting data frames when it fails to receive the Tx enable signal.

When the output of the timer 240 reaches the predetermined time slot, the timer 240 transmits an expire signal to the bandwidth control section 230. The bandwidth control section 230, in turn, outputs the Tx enable signal to the port controller 200 responsive to the expire signal. Thus, when the port controller 200 receives the Tx enable signal, the port controller 200 transmits data frames.

The bandwidth is controlled depending on the maximum quantity of data frames that may be transmitted during the predetermined time slot.

In the conventional bandwidth control apparatus shown in FIG. 2, the packet frames are not distributed uniformly during the overall time interval for transmitting packet frames but are concentrated in a specific time interval. For example, in the case where the bandwidth is restricted to $1/16$ of the bandwidth allocated to a specific port of the Ethernet switch, packet frames are concentrated during a $1/16$th time interval of the overall time interval and none of data frames are transmitted during a $15/16$th time interval when data frames are transmitted via the specific port.

Overloads, therefore, commonly occur at the specific ports.

An other conventional apparatus controls the ports' bandwidth using Inter Frame Gap (IFG) that exists between neighboring data frames.

FIG. 3 is a block diagram showing a conventional port controller using the IFG. As shown in FIG. 3, a port controller 300 transmits the data frame stored in a packet buffer 310 to a MAC transmitting section 320. The port controller 300 transmits frame length information to a bandwidth control section 330.

The bandwidth control section 330 outputs IFG time information responsive to the frame length information to the port controller 300. The IFG time information represents a period of time that is required for transmitting a previous data frame according to the frame length information. The port controller 300, therefore, stops-transmitting data frames during the period of time required for transmitting the previous data frame according to the IFG time information. The port controller 300 begins transmitting the data frame stored in the packet buffer 310 after the IFG time expires.

For example, in case the bandwidth has to be restricted to about ½ of the maximum bandwidth allocated to a specific port of the Ethernet switch, the IFG time is the same as the period of time required for transmitting the previous data frame. Thus, the bandwidth is restricted to ½ because the period of time during which the data frame is transmitted is the same as the period of time during which the data frame is not transmitted.

Compared with the bandwidth control method shown in FIG. 2, the bandwidth control method shown in FIG. 3 may be simply embodied without using the timer. The port controller 300, however, further requires another counter for counting the IFG time according to the IFG time information outputted from the bandwidth control section 330.

In addition, in the Ethernet network, the data frames have various lengths, for example 64 bytes~1518 bytes. Thus, the bandwidth control method using the IFG time has a drawback. The data frame may not be efficiently transmitted depending upon the length of the previous data frame.

When the length of the previous data frame is 1518 bytes, for example, a present data frame is transmitted after 1518 data bytes are transmitted even though the length of the present data frame is shorter than the length of the previous data frame. Therefore, the bandwidth control method using the IFG time may effectively prevent data frames from being transmitted where the total bandwidth is larger than the maximum bandwidth allocated to the specific port. However, in case a specific data frame having a length lower than a predetermined bandwidth is transmitted, the specific data frame may be greatly delayed depending upon length of the IFG time.

Accordingly, a need remains for an improved Ethernet switch.

SUMMARY

A feature of the present invention is to improve prior apparatus and methods for controlling bandwidth.

An apparatus is provided that includes a random variable generating section to generate a random variable corresponding to a predetermined ratio associated with a bandwidth decrease. A timer generates an expire signal and a bandwidth control section generates a transmit enable signal to a port responsive to the random variable and the expire signal. And a port controller transmits data frames responsive to the transmit enable signal and to generate a transmit request signal to the bandwidth control section.

The random variable generating section includes a bit pattern generator to generate a random bit pattern with a plurality of bits, at least one of the bits being a '1' and a logic gate to logically manipulate random bit pattern to generate the random variable.

The bit pattern generator is a linear feedback shift register.

The bandwidth control section generates a reset signal to reset the timer responsive to the transmit request signal. And the bandwidth control section receives the expire signal from the timer.

The apparatus controls a bandwidth of an Ethernet switch.

The expire signal indicates expiration of a time slot during which data frames are transmitted and each data frame has a 64 byte length.

A method for controlling port bandwidth in a network switch is provided. The method comprises generating a random variable corresponding to a predetermined ratio, the ratio being associated with a bandwidth decrease. The method receives a transmit request and counts up to a predetermined time slot responsive to receiving the transmit request. The method determines whether to transmit a data frame responsive to the counting and transmits the data frame with a probability of the random variable responsive to the determining.

The method comprises generating a random bit pattern including a plurality of bits, at least one of the plurality of bits being a '1' and logically manipulating the plurality of bits to generate the random variable. The method comprises transmitting the data frame comprises transmitting the data frame during the predetermined time slot and where the data frame has a 64 byte length.

An apparatus for controlling a port bandwidth in a network switch is provided that includes a random variable generating section to generate a random variable, the random variable being associated with a predetermined ratio and a data frame length. A timer counts up to a time slot. A bandwidth control section generates a bandwidth control signal for selectively transmitting the data frame to the port responsive to the random variable when the timer counts up to the time slot. And a transmitting section transmits a transmit request signal to the bandwidth control section and to transmit the data frame responsive to the bandwidth control signal.

The random variable generating section comprises a first random variable generating section to generate a first random variable by logically manipulating a plurality of bits in a random bit pattern and to generate a plurality of frame lengths that divide a data frame into a plurality of frame length levels. A variable combining section generates a length variable signal by logically manipulating one of the plurality of frame length levels responsive to a data frame length. And a second random variable generating section generates the random variable by logically manipulating the length variable signal and the first random variable.

The random variable decreases as the data frame length increases.

The first random variable generator comprises a linear feedback shift register.

The network switch is an Ethernet switch.

The data frame length is 64 bytes.

A method is provided that comprises generating a random variable responsive to a predetermined ratio and a data frame length. The method decreases a port bandwidth responsive to the predetermined ratio and receives a transmit request. The method counts up to a time slot responsive to the transmit request and determines whether to transmit a data frame responsive to the counting. And the method transmits the data frame with a probability of the random variable responsive to the determining.

Generating the random variable includes generating a first random variable by logically manipulating a random bit pattern including a plurality of bits, the plurality of bits including at least one '1', each '1' in the plurality of bits indicating a probability of ½ and each '0' in the plurality of bits indicating a probability of ½. The method includes generating a plurality of frame length signals to divide the data frame into a plurality of levels. The method includes generating a length variable signal by logically manipulating at least one of the plurality of frame length signals responsive to the data frame length. And the method includes generating the random variable by logically manipulating the first random variable and the length variable signals.

BRIEF DRAWINGS DESCRIPTION

The above and other advantages of the present invention will become more apparent by describing in detail the preferred embodiments thereof with reference to the accompanying drawings.

DETAILED DESCRIPTION

Hereinafter the embodiment of the present invention will be described in detail with reference to the accompanying drawings.

Figure 1:
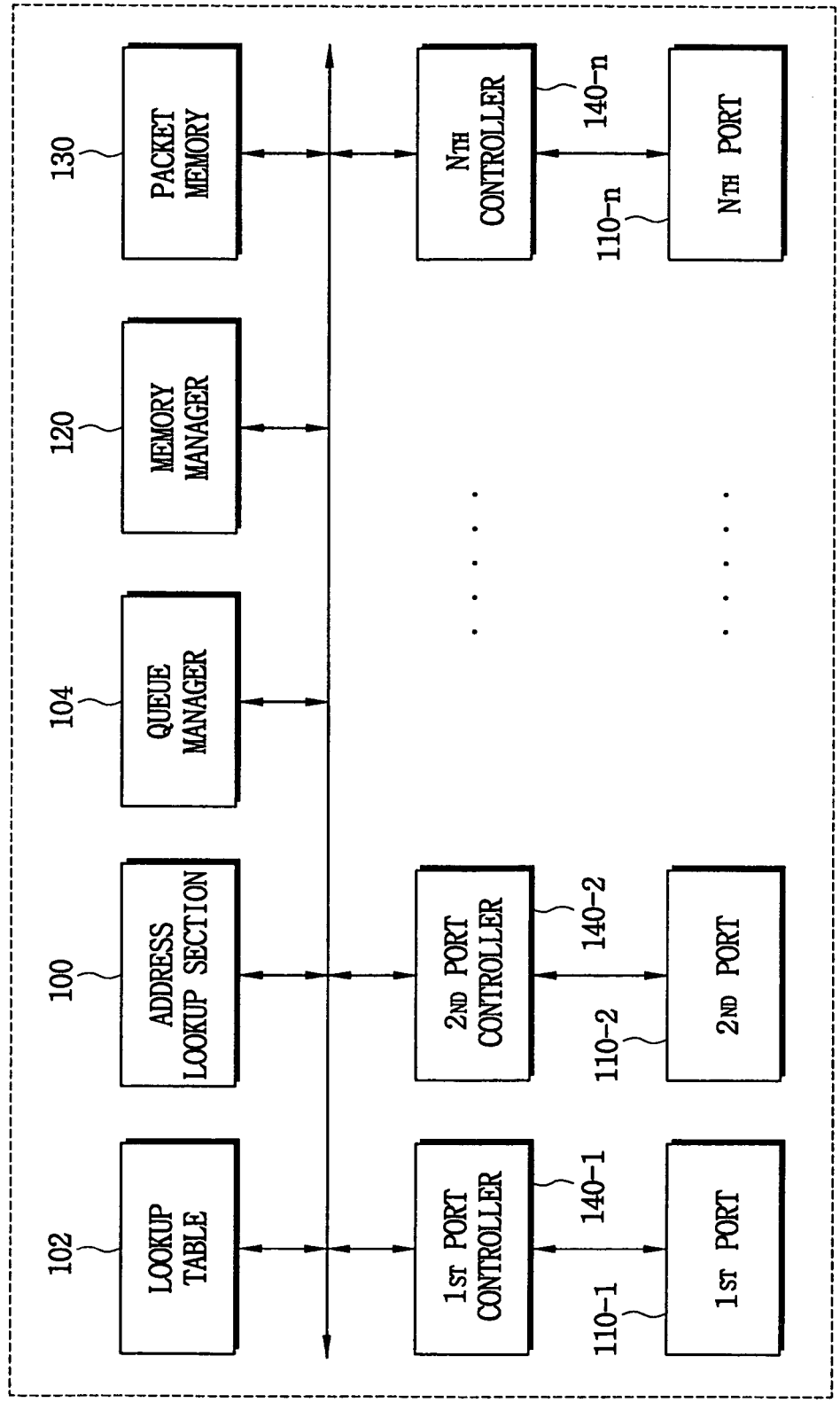
FIG. 1 is a schematic of an Ethernet switch.
Figure 2:
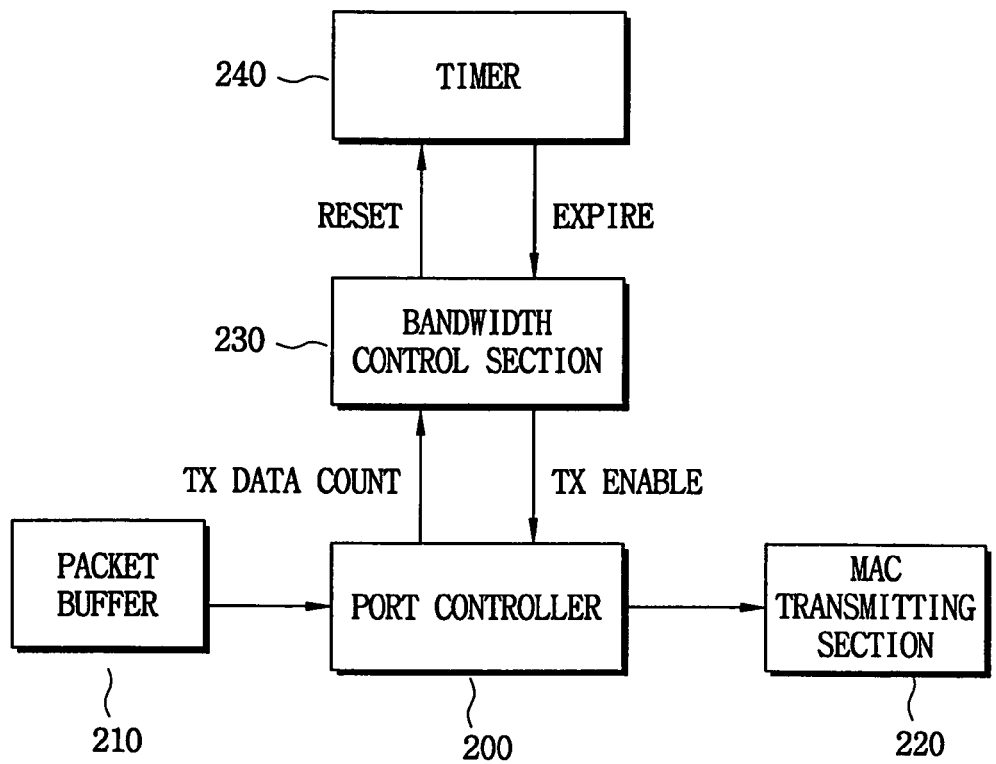
FIG. 2 is a block diagram of a conventional port controller.
Figure 3:
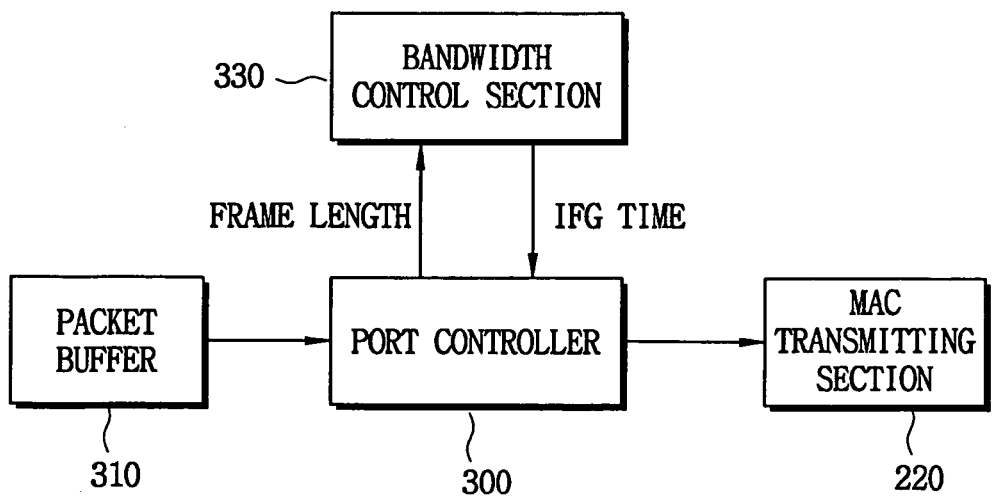
FIG. 3 is a block diagram of another conventional port controller.
Figure 4:
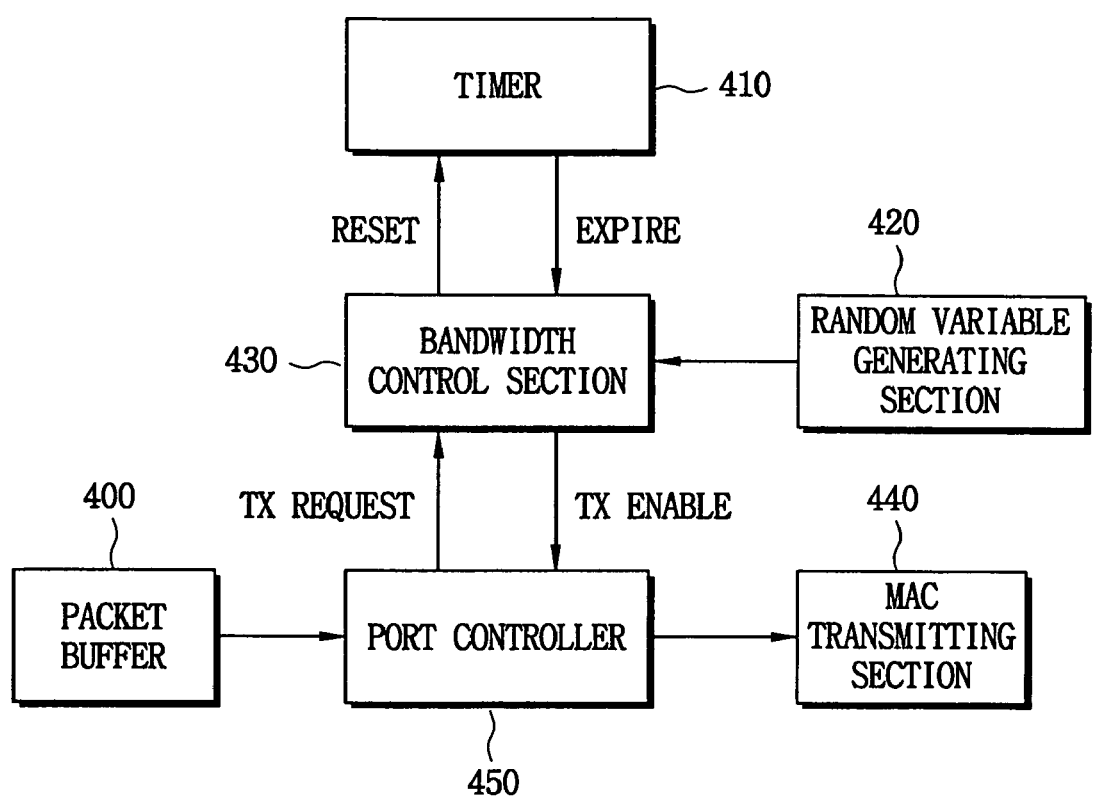
FIG. 4 is a block diagram of an apparatus for controlling bandwidth of an Ethernet switch according to one exemplary embodiment of the present invention.
Figure 5:
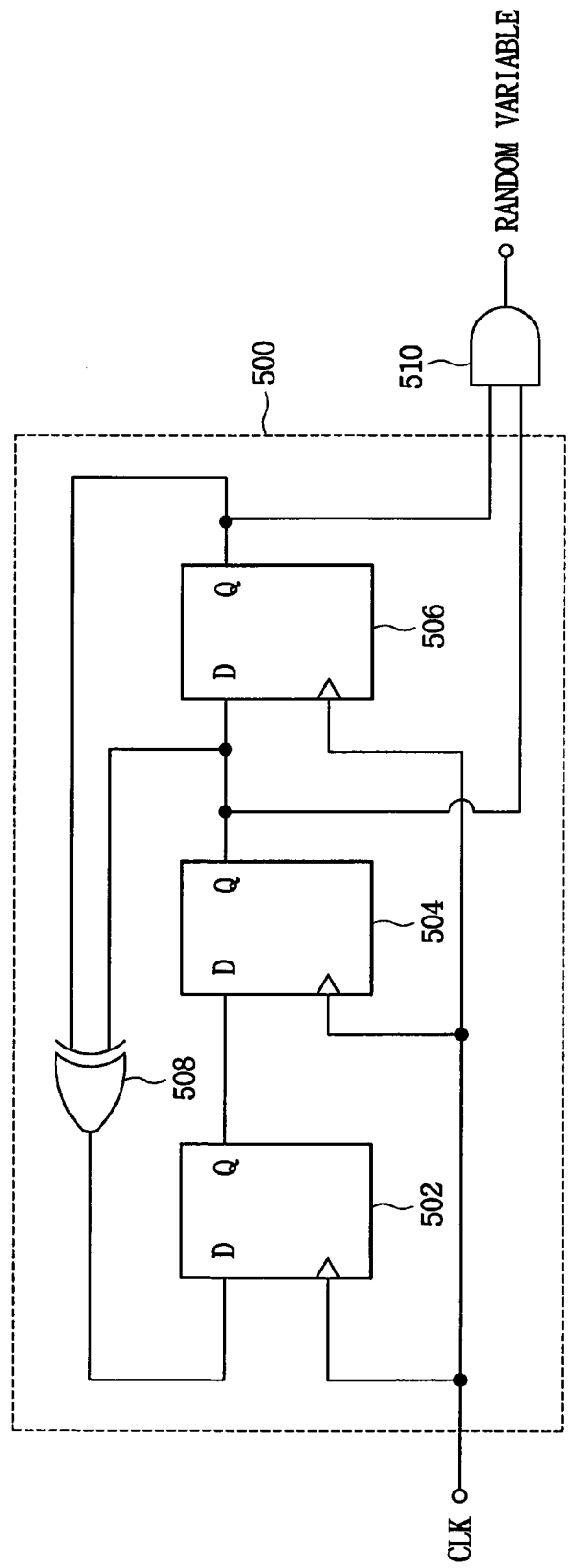
FIG. 5 is a block diagram of the random variable generating section shown in FIG. 4.

FIG. 4 is a block diagram of an apparatus for controlling bandwidth of an Ethernet switch according to one exemplary embodiment of the present invention. FIG. 5 is a block diagram of the random variable generating section shown in FIG. 4.

Referring to FIG. 4, the bandwidth control apparatus includes a packet buffer 400, a timer 410, a random variable generating section 420, a bandwidth control section 430, and a port controller 450.

The packet buffer 400 temporarily stores data frames before their transmission. The timer 410 counts up to a time slot that determines transmission of a data frame to the port of the Ethernet switch. The timer 410 generates an expire signal when the count reaches the time slot. The timer 410 provides the expire signal to the bandwidth control section 430.

The random variable generating section 420 generates a random variable corresponding to a predetermined ratio by which the bandwidth is decreased. The bandwidth control section 430 generates a bandwidth control signal or a frame transmission allow signal (a tx enable signal) for selectively transmitting the data frame to the port based on the random variable responsive to the expire signal from the timer 410. The port controller 450 transmits the data frame stored in the packet buffer 400 to the corresponding port (not shown) responsive to the bandwidth control signal via the MAC transmitting section 440.

The timer 410 determines a time slot used for determining whether a specific data frame is transmitted to the Ethernet switch port. For example, a length of one time slot corresponds to a time period during which the specific data frame is transmitted, and the specific data frame may have a 64 byte length corresponding to a minimum length of an Ethernet switch.

The random variable generating section 420, for example, generates a random variable that has '1' indicating a probability of ¼ or '0' indicating a probability of ¼ in case the bandwidth has to be restricted to about ¼ of the maximum bandwidth allocated to a specific Ethernet switch port. The random variable generating section 420, for example, generates a random variable that has '1' of a probability of ¾ or '0' of a probability of ¾ in case the bandwidth has to be restricted to about ¾ of the maximum bandwidth allocated to a specific port of the Ethernet switch.

As shown in FIG. 5, the random variable generating section 420 for generating a random variable having a transmission probability of ¼ includes a LFSR (Linear Feedback Shift Register) 500 and an AND gate 510.

The LFSR 500 includes first, second, third D flip flops 502, 504 and 506 and an exclusive OR (XOR) gate 508. The XOR gate 508 logically XORs the outputs of the second and third D flip flops 504 and 506. The XOR gate 508 provides its result to the first D flip flop 502. The AND gate 510 logically ANDs the outputs of the LFSR 500 to generate a random variable that has '1' of a probability of ¼ or '0' of a probability of ¼.

In general, the LFSR 500 generates pseudo random bit patterns (PRBS) and is widely used in various fields such as encryption and semiconductor chip test. The LFSR 500 continuously generates the pseudo random bit patterns when a seed value is given as an initial value and a clock signal is externally provided. The seed value may not have all zero bits such as with '000' or '0000', etc.

When the seed value is '111', for example, the LFSR 500 generates pseudo random bit patterns, e.g., {'111', '011', '001', '100', '010'. '101', '110'}.

The LFSR 500 repeatedly and sequentially generates seven random bit patterns using three bits except all zero bits '000'.

A person of reasonable skill in the art should understand that random bit patterns of more or less length are possible.

In addition, an n-bit LFSR may generate 2n-1 pseudo random bit patterns. When 'n' is larger than a predetermined value, each bit of the pseudo random bit pattern has a '1' indicating a probability of ½ or '0' indicating a probability of ½.

When a logical AND operation is performed on the outputs of second and third D flip flops 504 and 506, the random variable from the LFSR 500 has a probability of ¼ since each of bits of the pseudo random bit pattern has a '1' indicating a probability of ½ or a '0' indicating a probability of ½. In other words, each bit of the pseudo random bit patterns generated from the LFSR 500 has a '1' indicating a probability of ¼ or a '0' indicating a probability of ¼.

In case the bandwidth of a specific Ethernet switch port has to be restricted to about ¾ of the maximum bandwidth, a logical OR operation is performed on the outputs of second and third D flip flops 504 and 506 and the random variable outputted from the LFSR 500 may have a probability of ¾. When logical operation is performed on the outputs of the D flip flops 504 and 506 using logic gates, for example, AND or/and OR gate, the LFSR 500 may generate a random variable corresponding to the desired ratio for restricting the bandwidth.

The operation of the bandwidth control apparatus according to one exemplary embodiment of the present invention operates as follows. The operation of the bandwidth control apparatus will be described assuming the bandwidth of a specific Ethernet switch port is restricted to about ¼ of the maximum bandwidth. A person of reasonable skill in the art should recognize that the control apparatus can operate for bandwidths different than ¼.

The AND gate 510 logically ANDs the outputs of second and third D flip flops 504 and 506. The random variable generating section 420 generates a random variable having '1' indicating a probability of ¼ or a '0' indicating a probability of ¼.

The packet buffer 400 temporarily stores data frames before the data frames are transmitted via the ports of the Ethernet switch. The port controller 450 transmits a transmit request signal (a tx request signal) to the bandwidth control section 430. The tx request signal requests the bandwidth control section 430 to transmit the data frames stored in the packet buffer 400.

The bandwidth control section 430 transmits the reset signal to the timer 410 in response to the tx request signal outputted from the port controller 450. After the timer 410 resets responsive to the reset signal, the timer 410 begins the count operation again. The timer 410 outputs an expire signal to the bandwidth control section 430 when the timer's count reaches the time slot.

The bandwidth control section 430 determines whether a data frame can be transmitted in the time slot based on the probability of the random variable.

When it is determined that the data frame is transmitted, the bandwidth control section 430 outputs a bandwidth control signal (a tx enable signal) to the port controller 450. The port controller 450 transmits the data frame stored in the packet buffer 400 to the MAC transmitting section 440 responsive to the tx enable signal.

When it is determined that the data frame should not be transmitted, the bandwidth control section 430 outputs again the reset signal to the timer 410. The timer 410 resets and begins the count operation. The timer 410 outputs the expire signal to the bandwidth control section 430 when the output of the timer 410 reaches a next time slot. The timer 410 expires after time period corresponding to one time slot. The bandwidth control section 430 determines again whether a data frame should be transmitted in the time slot according to the probability of the random variable generated from the random variable generating section 420 when the bandwidth control section 430 receives the expire signal from the timer 410. The bandwidth control section 430 repeats the process until the data frame should be transmitted.

The tx enable signal outputted from the bandwidth control section 430 has a '1' indicating a probability of ¼ or a '0' indicating a probability of ¼ corresponding to the random variable, thus the tx enable signal having '1' or '0' is outputted to the port controller 450 with a probability of ¼.

Figure 6:
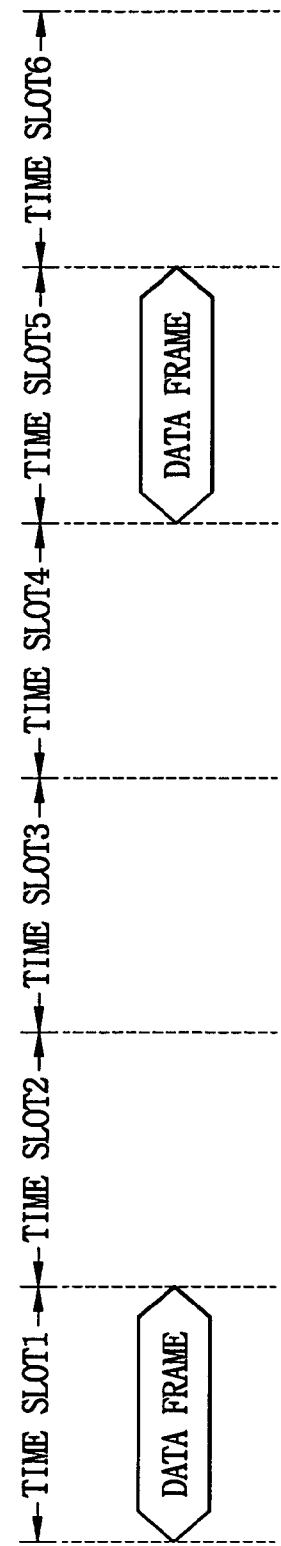
FIG. 6 is a diagram of transmitted data frames using the apparatus shown in FIG. 4.

FIG. 6 is a diagram of data frames that are transmitted under the bandwidth control apparatus shown in FIG. 4.

As shown in FIG. 6, data frames are transmitted during a single time slot (time slots 1, 5, . . . ) every four time slots via the MAC transmitting section 440 to the specific port. For example, data frames are transmitted during time slot 1 via the MAC transmitting section 440 to the specific port, and are not transmitted during time slots 2, 3 and 4. The data frame has a length, e.g., 64 bytes, that corresponds to a time slot.

According to the bandwidth control apparatus of one exemplary embodiment of the present invention, a specific data frame having a length of 64 bytes is transmitted with a probability of ¼. The bandwidth of the Ethernet switch, therefore, may be reduced to ¼.

Figure 7:
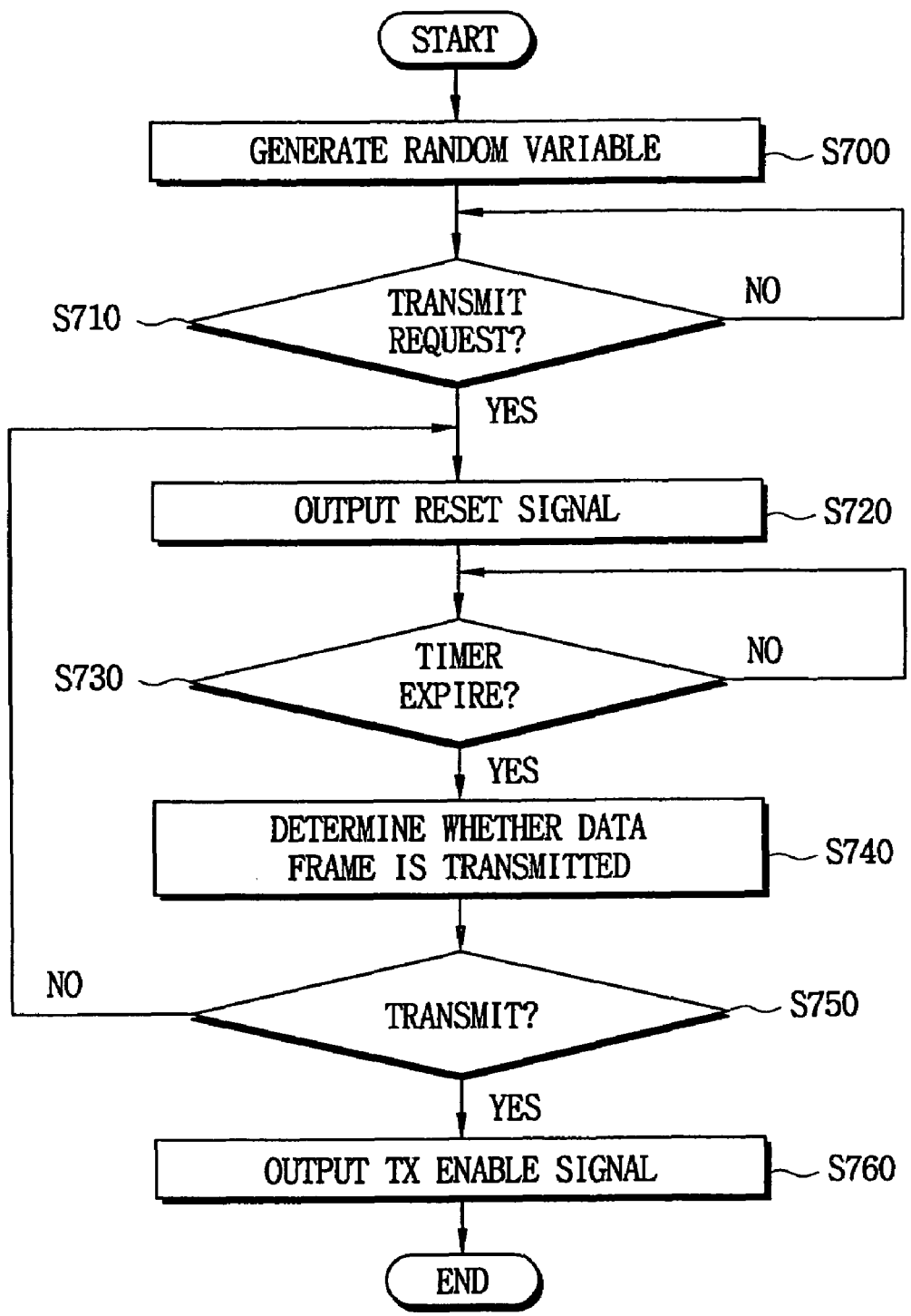
FIG. 7 is a flow chart of an exemplary method for controlling bandwidth.

A method of controlling the bandwidth by the bandwidth control apparatus according to one exemplary embodiment of the present invention is shown in FIG. 7.

Referring to FIG. 7, the random variable generating section 420 generates a random variable corresponding to the desired ratio for reducing (or restricting) the bandwidth of the port of the Ethernet switch (S700). The bandwidth control section 430 determines whether a transmit request signal (tx request signal) for a data frame is received from the port controller 450 (S710).

When the transmit request signal is received, the bandwidth control section 430 outputs the reset signal to the timer 410 (S720). The timer 410 resets the result of counting responsive to the reset signal, and begins the count again. The timer 410 outputs the expire signal to the bandwidth control section 430 when the count reaches one time slot.

The bandwidth control section 430 checks whether the expire signal is received from the timer 410 (S730). The bandwidth control section 430 determines whether the data frame should be transmitted according to the random variable (S740).

When it is determined that the data frame is transmitted (S750), the bandwidth control section 430 outputs a bandwidth control signal or a frame transmission allow signal (a tx enable signal) to the port controller 450 (760). The port controller 450 transmits the data frame via the MAC transmitting section 440 to the corresponding port responsive to the tx enable signal.

When it is determined that the data frame should not be transmitted, the bandwidth control section 430 outputs the reset signal to the timer 410. The bandwidth control section 430 determines again whether the data frame should be transmitted according to the probability of the random variable when the bandwidth control section 430 receives the expire signal from the timer 410. The bandwidth control section 430 repeats the process until it determines that the data frame should be transmitted.

Figure 8:
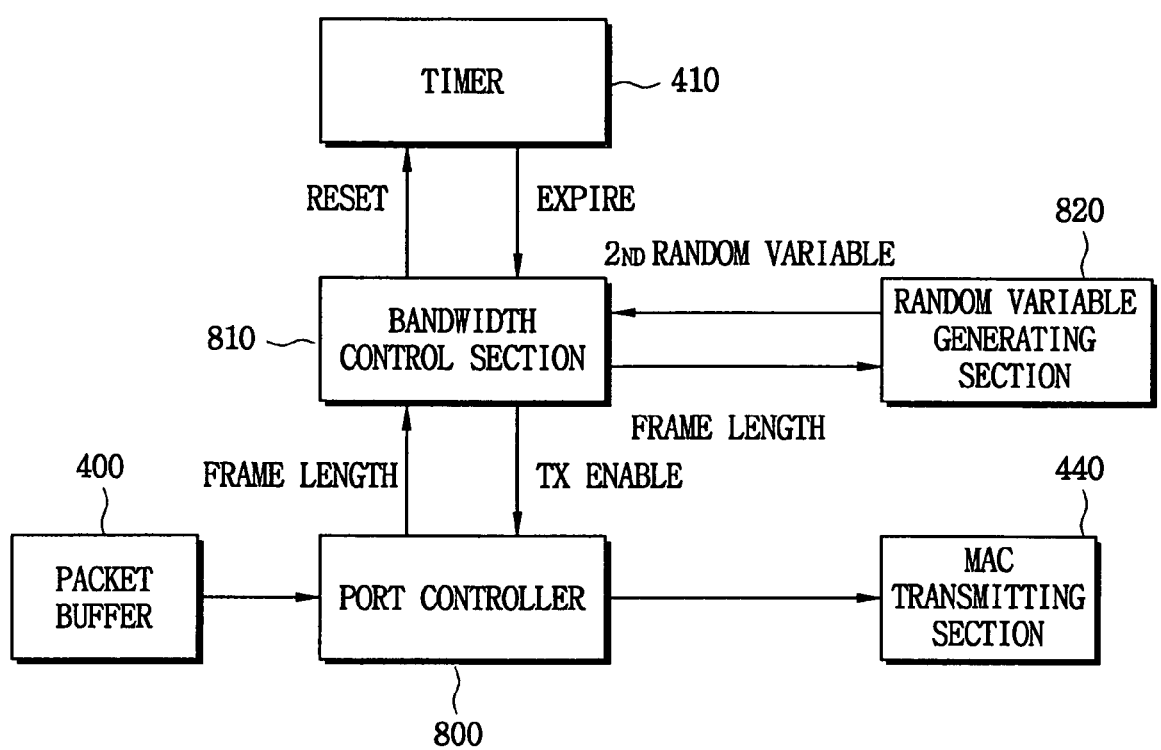
FIG. 8 is a block diagram of an apparatus for controlling bandwidth of an Ethernet switch according to another exemplary embodiment of the present invention.
Figure 9:
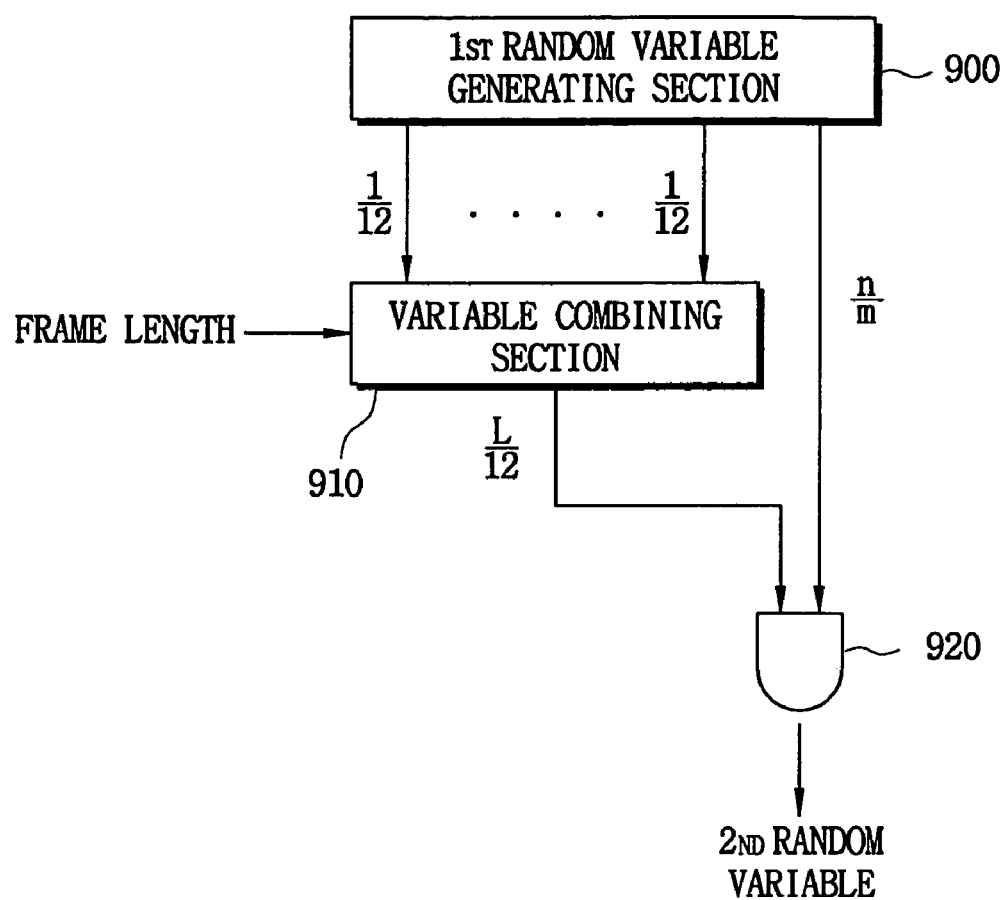
FIG. 9 is a block diagram of the random variable generating section of FIG. 8.

FIG. 8 is a block diagram of an apparatus for controlling bandwidth of an Ethernet switch according to another exemplary embodiment of the present invention. FIG. 9 is a block diagram of a random variable generating section shown in FIG. 8.

Referring to FIG. 8, the bandwidth control apparatus includes a packet buffer 400, a port controller 800, a MAC transmitting section 440, a bandwidth control section 810, a timer 410, and a random variable generating section 820.

The packet buffer 400, MAC transmitting section 440, and timer 410 operate similarly to earlier described counterparts shown in FIG. 4.

The port controller 800 outputs length information, e.g., frame length information, of a specific data frame to the bandwidth control section 810, and transmits the specific data frame stored in the packet buffer 400 via the MAC transmitting section 440 to the corresponding port (not shown) responsive to the tx enable signal.

The bandwidth control section 810 outputs the frame length signal outputted from the port controller 800 to the random variable generating section 820, and outputs the reset signal to the timer 410 responsive to the frame length information. In addition, when the bandwidth control section 810 receives the expire signal from the timer 410, the bandwidth control section 810 determines whether a specific data frame should be transmitted or not according to a second random variable generated from the random variable generating section 820. The bandwidth control section 810 outputs the tx enable signal to the port controller 800 when it is determined that the specific data frame is transmitted.

The random variable generating section 820 generates at least one first random variable based on the desired ratio for reducing the bandwidth of the Ethernet switch, and performs a logic operation on at least one first random variable based on the frame length information to generate a second random variable. The second random variable decreases as the length of the data frame increases.

As shown in FIG. 9, the random variable generating section 820 includes a first random variable generating section 900, a variable combining section 910, and a second random variable generating section 920.

The first random variable generating section 900 generates a first random variable (n/m) and twelve frame length level signals. The frame length level signal divides the length of the data frame into twelve levels. Each of the frame length level signals may have a '1' indicating a probability of 1/12 or a '0' indicating a probability of 1/12. In one embodiment, n is less than m, and the bandwidth of the Ethernet switch is not reduced when n is equal to m.

The variable combining section 910 selectively combines the frame length level signals depending the frame length information to generate a length variable signal having a '1' indicating a probability of L/12 or a '0' indicating a probability of L/12. The probability L/12 is related to the frame length.

For example, the variable combining section 910 selects a predetermined number of frame length level signals out of the twelve frame length level signals from the first random variable generating section 900 based on the frame length information. The section 910 logically ANDs the selected frame length level signals to output the length variable signal having a '1' indicating a probability of L/12 or a '0' indicating a probability of L/12. For example, L may be determined according to table 1.

TABLE 1

| Frame length information | Frame length (byte) | L |
|---|---|---|
| 0000 | 64-127 | 12 |
| 0001 | 128-255 | 11 |
| 0010 | 256-383 | 10 |
| 0011 | 384-511 | 9 |
| 0100 | 512-639 | 8 |
| 0101 | 640-767 | 7 |
| 0110 | 768-895 | 6 |
| 0111 | 896-1023 | 5 |
| 1000 | 1024-1151 | 4 |
| 1001 | 1152-1279 | 3 |
| 1010 | 1280-1407 | 2 |
| 1011 | 1408-1518 | 1 |
| 1100 | | |
| 1101 | | |
| 1110 | | |
| 1111 | | |

When the frame length of the data frame is 1518 bytes, L is 1. The variable combining section 910 selects only one frame length level signal out of the twelve frame length level signals outputted from the first random variable generating section 900. The section 910 generates the length variable signal having a '1' indicating a probability of $1/12$ or a '0' indicating a probability of $1/12$. In addition, when the frame length of the data frame is 128 bytes, L is 11. The variable combining section 910 selects eleven frame length level signals out of the twelve frame length level signals outputted from the first random variable generating section 900. The section 910 generates the length variable signal having a '1' indicating a probability of $11/12$ or a '0' indicating a probability of $1/12$.

In general, the frame length of a data frame is represented using eleven bits. The upper four bits of the eleven bits, for example, may represent the frame length information for the variable combining section 910.

The AND gate 920 logically ANDs the first random variable and the length variable signal. The first random variable has a '1' indicating a probability of n/m or a '0' indicating a probability of n/m, and the length variable signal has a '1' indicating a probability of L/12 or a '0' indicating a probability of L/12. Thus, the AND gate 920 outputs a second random variable having a '1' indicating a probability of nL/(12 m) or a '0' indicating a probability of nL/(12 m) to the bandwidth control section 810.

Therefore, when the frame length of the data frame is 64 bytes, L is 12, and the second random variable is n/m. When the frame length of the data frame is 1518 bytes, L is 1, and the second random variable is n/(12 m). Thus, the transmission probability of the data frame having a length of 1518 bytes is $1/12$ of the transmission probability of the data frame having a length of 64 bytes The bandwidth control section 810 outputs the tx enable signal to the port controller 800. The tx enable signal has a '1' with the probability corresponding to the probability of '1' of the second random variable outputted from the random variable generating section 820. The port controller 800 transmits the data frame stored in the packet buffer 400 via the MAC transmitting section 440 to the corresponding port in response to the tx enable signal.

Figure 10:
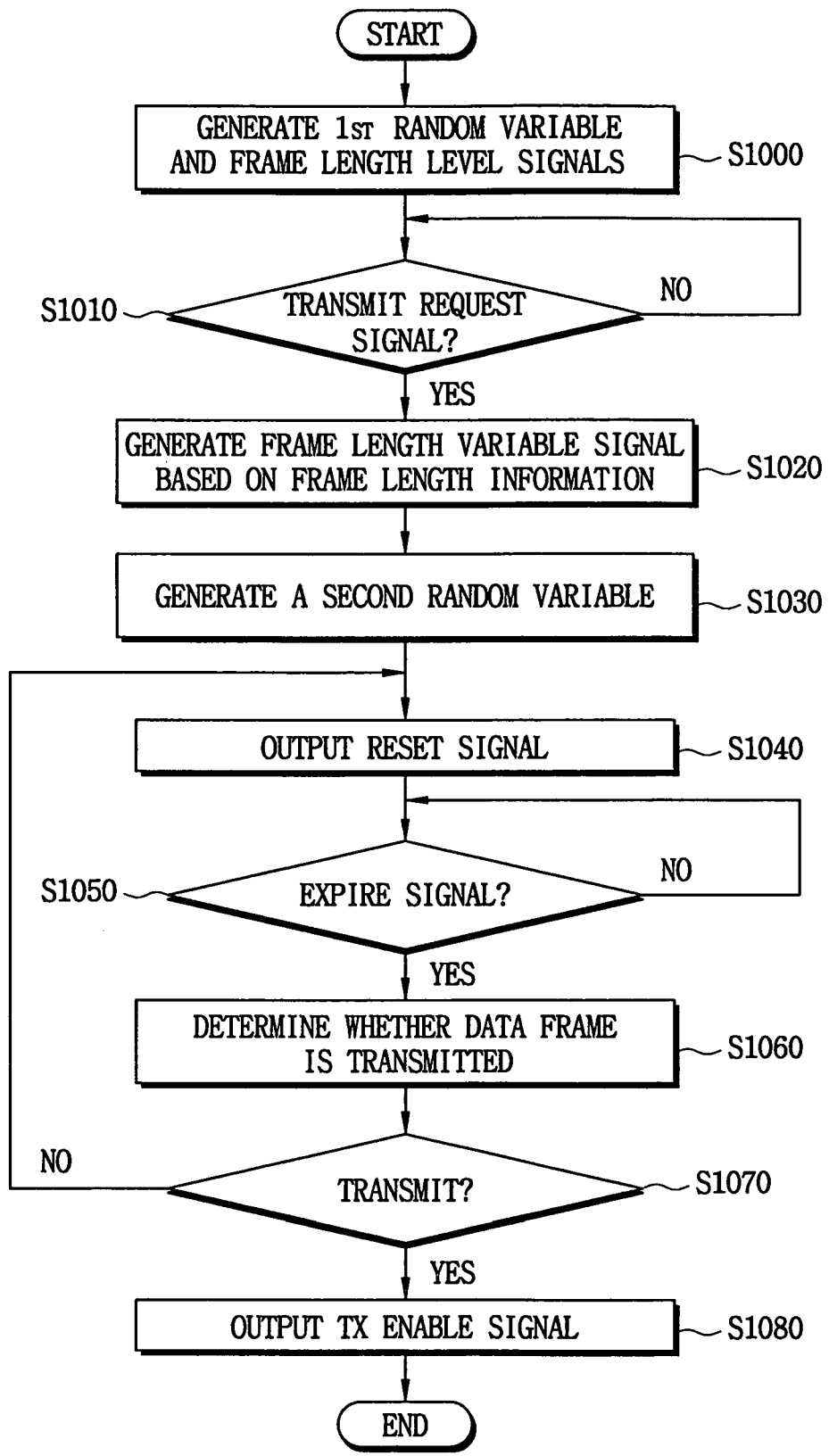
FIG. 10 is a flow chart of another exemplary method for controlling bandwidth.

The method of controlling the bandwidth by the bandwidth control apparatus corresponding to the embodiment shown in FIG. 9 is as follows. Referring to FIG. 10, the random variable generating section 820 generates a first random variable and a plurality of frame length level signals (S1000). The first random variable corresponds to the desired ratio for reducing (or restricting) the bandwidth of the port of the Ethernet switch. For example, the number of the frame length level signals may be twelve, and the frame length level signal divides the length of the data frame into twelve levels.

The bandwidth control section 810 checks whether frame length information of the data frame and transmit request signal (tx request signal) is received from the port controller 800 (S1010).

The random variable generating section 820 selects a predetermined number of frame length level signals among the frame length level signals based on the frame length information, generates the length variable signal (S1020). The section 820 combines the first random variable and the length variable signal to generates the second random variable (S1030).

The second random variable has '1' or '0' of which probability varies depending upon the frame length of the data frame. The second random variable decreases as the frame length increases.

When the transmit request signal is received, the bandwidth control section 810 outputs the reset signal to the timer 410 (S1040). The timer 410 resets counting responsive to the reset signal. The timer 410 begins to count again and outputs the expire signal to the bandwidth control section 810 when the result of counting reaches the time period of one time slot.

The bandwidth control section 810 checks whether the expire signal is received from the timer 410 (S1050), and determines whether the data frame should be transmitted or not according to the second random variable (S1060).

When it is determined that the data frame is transmitted (S1070), the bandwidth control section 810 outputs a frame transmission allow signal (a tx enable signal) to the port controller 800 (S1080), and the port controller 800 transmits the data frame via the MAC transmitting section 440 to the corresponding port responsive to the tx enable signal.

When it is determined that the data frame should not be transmitted, the bandwidth control section 810 outputs the reset signal to the timer 410. The bandwidth control section 810 determines whether the data frame should be transmitted according to the probability of the second random variable when the bandwidth control section 810 receives the expire signal from the timer 410. The bandwidth control section 810 repeats the process until it is determined that the data frame should be transmitted.

While the exemplary embodiments of the present invention and its advantages have been described in detail, it should be understood that various changes, substitutions, and alterations can be made herein without departing from the scope of the invention as defined by appended claims.

I claim:

1. An apparatus for controlling a port bandwidth in a network switch, comprising:
    a random variable generating section to generate a random variable, said random variable generating section comprising:
        a first random variable generating section to generate a first random variable by logically manipulating a plurality of bits in a random bit pattern and a plurality of frame lengths that divide a data frame into a plurality of frame length levels;
        a variable combining section to generate a length variable signal by logically manipulating one of the plurality of frame length levels responsive to a data frame length; and
        a second random variable generating section to generate the said random variable by logically manipulating the length variable signal and the first random variable;
        where said random variable decreases as the data frame length increases;
    a timer to count up to a time slot;
    a bandwidth control section to generate a bandwidth control signal for selectively transmitting the data frame to the port responsive to said random variable when the timer counts up to the time slot; and a transmitting section to transmit a transmit request signal to the bandwidth control section and to transmit the data frame responsive to the bandwidth control signal.

2. The apparatus of claim 1 where the first random variable generator comprises a linear feedback shift register.

3. The apparatus of claim 1 where the network switch is an Ethernet switch.

4. The apparatus of claim 3 where the data frame length is 64 bytes.

5. A method for restricting bandwidth of at least one port of a switch, comprising:

categorizing a plurality of data frames into a predetermined number of levels, each of the plurality of data frames being assigned to one of the levels according to a length of the data frame;

associating a number to each of the data frames, the number corresponding to one of the levels;

determining a first transmission probability by dividing the associated number by the predetermined number;

generating a random variable as a function of a predetermined ratio, the random variable indicating a second transmission probability;

determining a third transmission probability as a function of the first transmission probability and the second transmission probability; and transmitting each of the data frames over the at least one port responsive to the third transmission probability.

6. The method of claim 5 where generating the random variable comprises:

logically manipulating a random bit pattern including a plurality of bits, the plurality of bits forming a pattern of at least one '1' and at least one '0' which correspond to the second transmission probability, the second transmission probability being used to determine whether each of the data frames should be transmitted over the at least one port, where the predetermined number of levels remains constant and the associated number decreases responsive to an increase in the length of the data frame.

7. The method of claim 5 further comprising:

defining a plurality of time slots;

using a timer to count a first time slot responsive to a reset signal;

transmitting an expire signal from the timer to a bandwidth control section when the timer reaches an end of the first time slot;

determining whether to transmit each of the data frames over the at least one port within a second time slot responsive to the timer reaching the end of the first time slot; and transmitting at least one data frame over the at least one port within the second time slot only if the third transmission probability indicates that a transmission of the at least one data frame is allowed.

8. The method of claim 7, further comprising:

resetting the timer after the timer reaches an end of each of the plurality of time slots.

9. The method of claim 5, wherein determining a third transmission probability includes:

using a single AND gate to generate the third transmission probability as a function of the first transmission probability and the second transmission probability.

10. An apparatus for restricting bandwidth of at least one port of a switch, comprising:

a random variable generating section configured to generate a third random variable by logically manipulating a first random variable and a second random variable, the first random variable having a first probability corresponding to a predetermined ratio for restricting bandwidth, the second random variable having a second probability in substantially inverse proportion to a length of a data frame;

a timer configured to count up to a time slot;

a bandwidth control section configured to generate a bandwidth control signal for selectively transmitting the data frame over the at least one port responsive to the third random variable when the timer counts up to the time slot; and a transmitting section configured to transmit the data frame responsive to the bandwidth control signal.

11. The apparatus of claim 10, where the random variable generating section comprises:

a first random variable generating section configured to generate the first random variable and configured to generate a predetermined number of frame length level signals, each of the frame length level signals having a third probability corresponding to the predetermined number;

a variable combining section configured to generate the second random variable by logically manipulating the frame length level signals responsive to the length of the data frame; and a second random variable generating section configured to generate the third random variable by logically manipulating the first random variable and the second random variable.

12. The apparatus of claim 11, where the first random variable generating section comprises:

a linear feedback shift register (LFSR) configured to generate a random bit pattern including a plurality of bits, each of the plurality of bits having a fourth probability;

a first combinational logic unit configured to generate the first random variable by logically manipulating the plurality of bits; and a second combinational logic unit configured to generate the frame length level signals by logically manipulating the plurality of bits.

13. The apparatus of claim 12, where the fourth probability is one-half.

14. The apparatus of claim 11, where the second random variable generating section includes an AND gate configured to perform a logical AND operation on the first random variable and the second random variable to generate the third random variable.

15. The apparatus of claim 10, where the second probability decreases responsive to an increase in the length of the data frame.

16. The apparatus of claim 10, wherein the first probability corresponds to n/m, where the bandwidth control section is configured to reduce transmission of the data frame when n is less than m, and where the bandwidth control section is configured to not reduce transmission of the data frame when n is equal to m.

17. The apparatus of claim 10, wherein the second probability corresponds to L/12, where L is a natural number from 1 to 12, and where L is inversely proportional to the length of the data frame.

18. The apparatus of claim 10, where the third random variable corresponds to nL/12 m, where n is less than m, and where L is a natural number inversely proportional to the length of the data frame.

* * * * *